United States Patent [19]
Clark et al.

[11] 3,722,367
[45] Mar. 27, 1973

[54] STEERING SYSTEM
[75] Inventors: Raymond Clark, Pewaukee; Dale A. Knutson, Oconomowoc, both of Wis.
[73] Assignee: Applied Power Industries, Inc., Milwaukee, Wis.
[22] Filed: Nov. 4, 1970
[21] Appl. No.: 86,783

[52] U.S. Cl.....................91/367, 91/384, 91/471 R
[51] Int. Cl.........F15b 13/16, F15b 9/10, F15b 15/17
[58] Field of Search..........................91/367, 384, 417

[56] References Cited

UNITED STATES PATENTS

| | | | |
|---|---|---|---|
| 2,627,847 | 2/1953 | Clark et al. | 91/384 |
| 2,931,375 | 4/1960 | Lewis | 91/384 |
| 3,044,451 | 7/1962 | Morrison | 91/367 |
| 3,071,009 | 1/1963 | Stearns | 91/367 |
| 3,220,317 | 11/1965 | Fuell | 91/384 |

*Primary Examiner*—Paul E. Maslousky
*Attorney*—John J. Bryne

[57] ABSTRACT

This invention relates to a power system for accurately moving and holding a relatively large load with relatively small and sensitive power inputs. The system includes a power cylinder, a control valve pivotally mounted thereto, a steering push-pull cable or rotary input, and a mechanical linkage connecting the input, the spool of the valve and the piston rod of the power cylinder.

5 Claims, 5 Drawing Figures

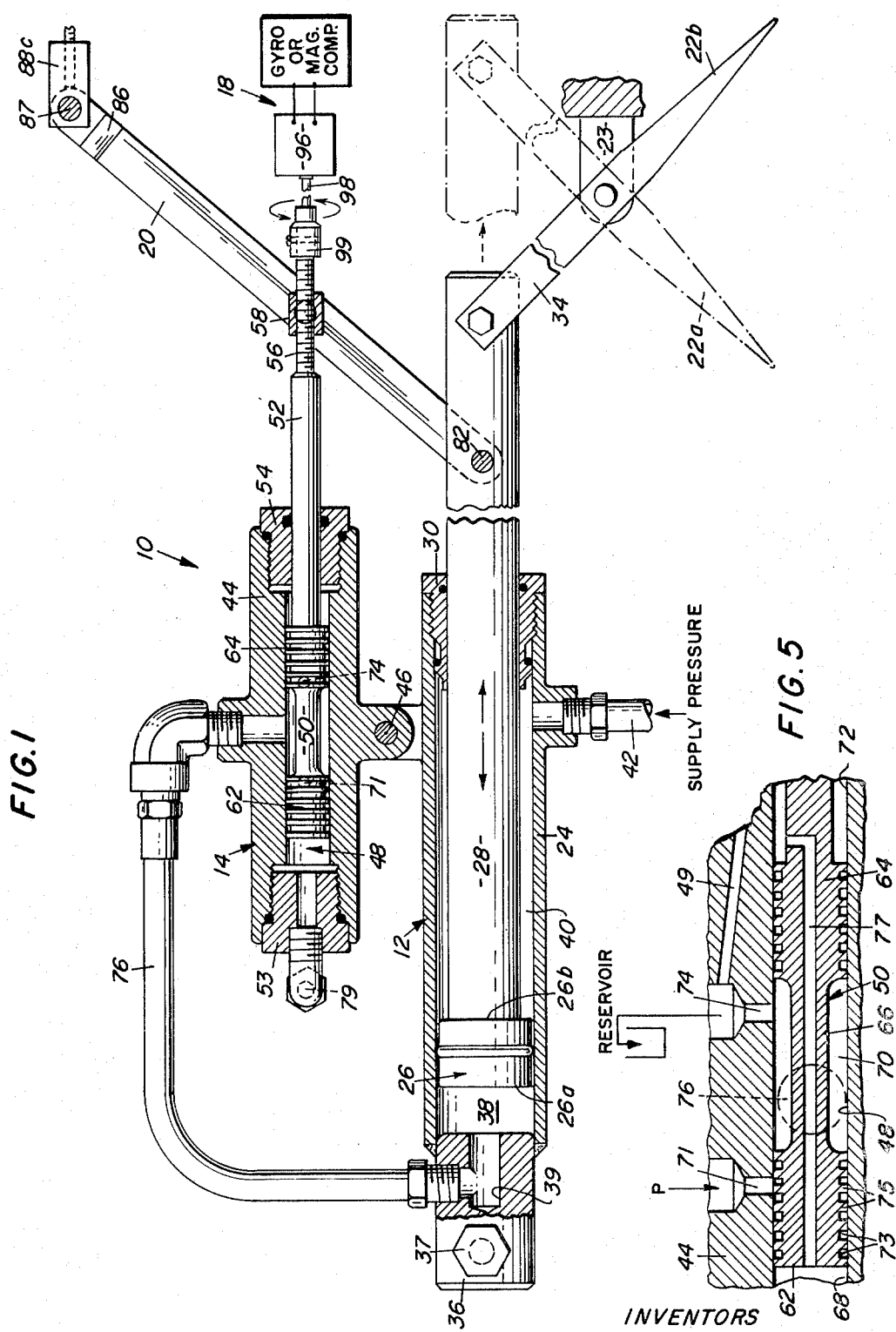

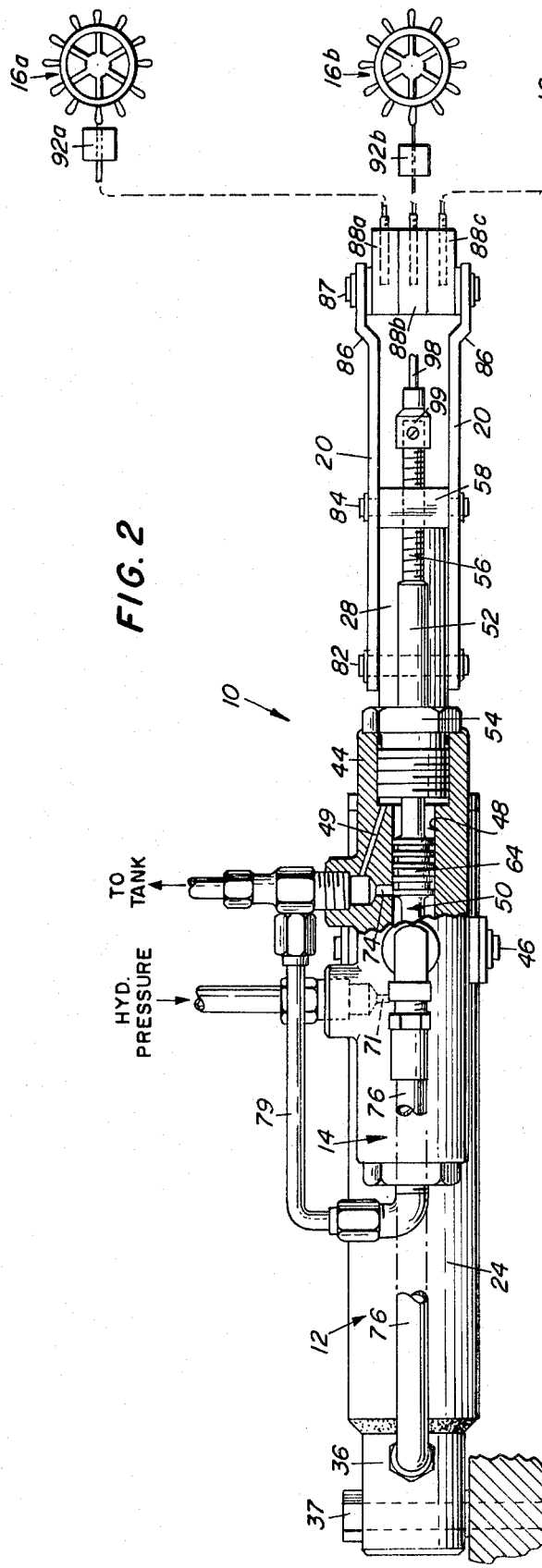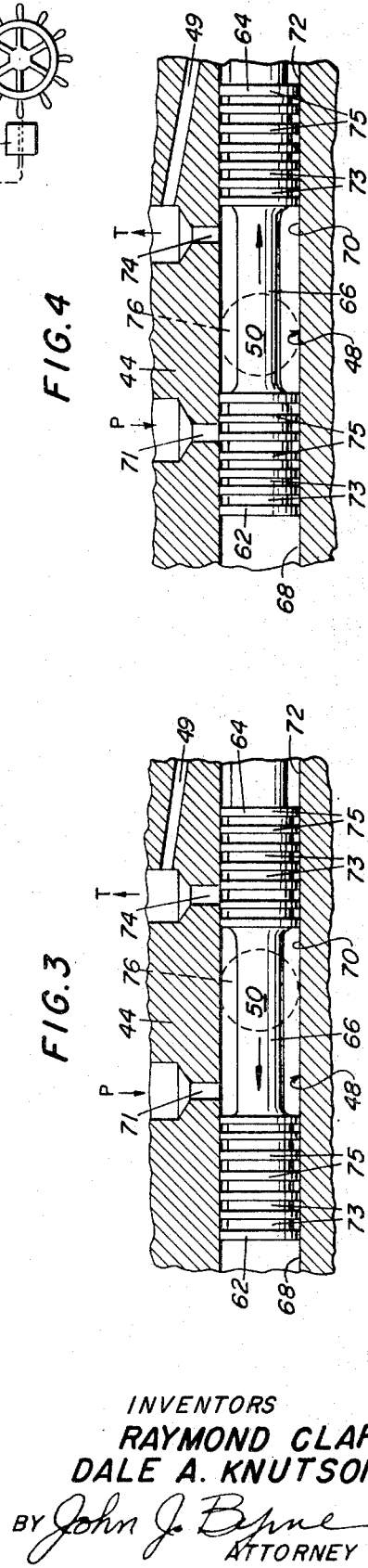

STEERING SYSTEM

This invention relates to a hydraulic power system wherein relatively light and sensitive signals are converted into a corresponding movement in a relatively resistive load means. More particularly, the system of this invention has important utility in the steering systems of land, air or waterborne vehicles. It is particularly adapted for steering systems having more than one steering input means and having a hydraulic power supply and gyro compasses for automatic navigation.

A principal objective of this invention is to provide a system to convert a signal transmitted through a push-pull cable from a steering device or the like into a corresponding movement in a steering component such as a ship's rudder, the wheels of a land vehicle or the control surfaces of an aircraft.

A further objective of this invention is to provide a power steering assembly which can accommodate a manual steering means and automatic pilot drive means of a type having a rotary output wherein the manual signal can temporarily override the autopilot signal.

A further objective of this invention is to provide a control valve spool of the low-flow type which has a plurality of grooves on the lands thereof to eliminate the necessity of forming balance grooves in the cylinder thereof.

A still further objective of this invention is to provide a remote control steering assembly wherein the system can receive its steering intelligence from a plurality of sources. For instance, in many larger yacht-type vessels and in airplanes there will be as many as two or three steering locations as well as an autopilot driven controlled by a gyro or magnetic compass means. An objective of this invention is to provide a system wherein the steering intelligence can be received from any of these sources with the manual steering automatically overriding the automatic pilot.

Another objective of this invention is to provide means for operating the steering system mechanically in the event of a power failure.

These and other objects of the invention will become more apparent to those skilled in the art by reference to the following detailed description when viewed in light of the accompanying drawings wherein:

FIG. 1 is a horizontal cross-section of the system of this invention with some parts shown in diagrammatic form;

FIG. 2 is a top plan view partially in cross-section of the apparatus of FIG. 1;

FIGS. 3 and 4 are partial cross-section top plan views of the control valve illustrating when the spool thereof is displaced;

FIG. 5 is a partial cross-section top plan view of a modified form of the control valve including an axial passageway.

It is to be understood that the hydraulic system 4 of this invention can be used whereever it is desired to move a load with a relative small force input. However, this invention, for purposes of illustration, will be described in terms of its utility in a steering system for a waterborne vessel.

Referring now with more particularity to the drawings wherein like elements are indicated by like numerals, the numeral 10 indicates the system of this invention. The principal components of the invention are a hydraulic jack 12, a control valve 14, manual steering systems 16A, 16B, and 16C, an automatic pilot system 18 and a linkage 20. The system shown in the embodiment described is adapted to pivot a rudder 22 in response to steering intelligence from either of the steering assemblies 16 or autopilot system 18.

The jack assembly 12 is comprised of a cylinder 24 which reciprocally receives a piston 26. Attached to the piston 26 is a piston arm 28 which extends through an end seal 30. At its free end, arm 28 is apertured for affixation to a tiller arm bracket 34 which in turn is pivotally mounted in bracket 23. The tiller bracket is fixedly secured to the rudder 22 to the dotted line positions 22a or 22b shown in FIG. 1. The other end of cylinder 24 is enclosed by a plug member 36 which is affixed to the vessel's transom by way of mounting pin 37.

The piston 26 divides cylinder 24 into expansible chambers 38 and 40. The chamber 40 is in constant communication with supply pressure through passageway and conduit system 42. The chamber 38 is communicated to a control pressure via the bore 39.

The control valve 14 is comprised of a cylinder 44 pivotally attached to the cylinder 24 by way of pivot means 46. The cylinder 44 has a passageway 48 therethrough reciprocally receiving a spool 50. The spool 50 has a spool arm 52 which extends beyond cylinder 44 through an end seal 54. Arm 52 is threaded at its outer end 56 to threadably receive a pivot nut or block 58. The spool 50 is formed of primary lands 62 and 64 connected by a stem portion 66. The lands divide the passageway 48 into chambers 68, 70 and 72. The lands 62 and 64 are grooved at 73 as best seen in the enlargement of FIGS. 3 and 4. Communicating the passageway 48 which supply pressure is an aperture 71 and aperture 74 communicates passageway 48 with tank or reservoir pressures. A conduit 76 communicates the chamber 70 to the chamber 38 of the jack 12. The chamber 68 is communicated to tank via a conduit 79. A modified form of the valve is shown in FIG. 5 wherein conduit 79 is eliminated and chamber 68 is communicated to chamber 72 via axial passageway 77 in spool 50. Chamber 72 is in constant communication with tank. Note that grooves 73 form secondary lands 75 of lesser width and spacing than the diameter of apertures 71 and 74. Thus, when one of the primary lands 62 or 64 closes one of the apertures 71, 74, fluid will circumscribe the spool in at least one of the grooves 73 to thereby provide a circumferential pressure balance to prevent spool binding. The exterior grooves 73 are less expensive to form than the inner, annular pressure grooves in the cylinder wall normally associated with the low flow spool valves to provide circumferential pressure balance.

The linkage 20 is pivotally secured to arm 29 about pins 82. The linkage 20 is pivotally secured to the pivot block 58 about pins 84. At it outer end, the linkage 20 forms a trunnion 86 to which a plurality of cable mounting blocks 88A, 88B, and 88C are pivotally secured. The mounting blocks are fixdly secured to cables 9 A, 9 B and 9 C of the vessel's steering wheels. A rotation of any one of the steering wheels causes the cable driven thereby move longitudinally of itself for operational purposes hereinafter more fully described.

The autopilot assembly 18 is comprised of a gyro or magnetic compass 94 of known design giving an electrical directional signal to an autopilot driver 96 of the type having a rotary output through cable 98. The rotary cable is affixed to the outer end 56 of arm 52 by way of a hub 99.

In FIGS. 1 and 2, the spool 50 is shown in the null or balanced position whereby piston 26 is hydraulically locked against movement and the rudder is held in the desired position. When one of the steering wheels 16 is turned counterclockwise, arm 20 pivots counterclockwise with pins 82 defining its pivot point. This movement will drive spool 50 to the left to the position shown in FIG. 3 to cover tank aperture 74 and to open pressure aperture 71. The supply pressure in aperture 71 is reflected sequentially in chamber 70, conduit 76 and then chamber 38. As was previously discussed, the chamber 40 is always at supply pressure. However, since the effective pressure working surface 26A is approximately twice the pressure working surface 26B, piston 26 and piston arm 28 will move to the right. The tiller arm will thus move toward the position shown by dotted line 22A. The movement of arm 28 to the right causes linkage 20 to rotate again counterclockwise but this time about a pivot point defined by pins 87. This movement of the linkage 20 will carry spool 50 to the right until the balanced or null position whereupon movement of the piston 26 ceases and the tiller arm is held immovable until a signal is again transmitted to the spool 50 to shift it from the null position. The converse of this operation is true. If any of the cables 92 move linkage 20 clockwise about pins 82, the spool 50 is carried to the right-hand position as shown in FIG. 4, thereby closing pressure aperture 71 and opening tank aperture 74. This causes a pressure decrease in chamber 38 and the piston 26 will move to the left until spool 50 is again carried to its balanced or null position by linkage 20 which rotates clockwise bout pins 87. In the preferred embodiment the rudder is substantially aligned with the longitudinal axis of the vessel when the piston 26 is approximately midway of the chamber defined by the cylinder 24.

Note that valve 14 is pivotally mounted on the cylinder 24. This mounting is necessary in that the vertical distance between pins 82 and blocks 58 changes as the linkage 20 pivots about pins 82 or 87 and the pivotal movement between valve 14 and cylinder 26 permits straight line reciprocal movement of the rod 52 over the range of movement of linkage 20.

When the vessel is operating on autopilot, the rotary movement of cable 98 and hub 99 will cause arm 52 to rotate in block 58 causing spool 50 to move longitudinally of the housing 44 as a result of the threaded engagement of outer end 56 of arm 52 with block 58. This, in turn, will either decrease or increase the pressure in chamber 38 as previously described. A corresponding motion will take place in piston 26 to carry spool 50 to it null position via linkage 20. Note that the auto gyro will move the spool relative to cylinder 44 via rotary motion and the manual steering will move the spool as a result of a linear motion. In either event, the result is the same.

It should be noted that when the vessel is under the control of autopilot, a movement in any of the cables 90 will immediately cause the arm 20 to overcome the signal of the autopilot. This is advantageous in unexpected emergency situations.

The system is designed such that in the event of hydraulic failure the steering can be effected mechanically. This can be seen with reference to FIG. 1 wherein if the linkage is caused to move to the left or in a counterclockwise direction, the spool is similarly shifted to the left as described earlier. In the event of hydraulic failure, however, the spool can be moved to the left until its end face abuts the lug 53 whereupon the pivot 84 becomes fixed, and continued movement of the linkage 20 in the same direction will cause the piston 26 to be pulled outwardly and to the right as shown in the drawings. The same occurs when the linkage is swung to the right forcing the spool 50 into abutment with the end plug 54, again causing the pivot 84 to become fixed, whereupon continued movement of the linkage 20 causes the piston 26 to move inwardly of the cylinder 24.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

We claim:

1. A steering system for controlling the steering component of a vehicle comprising
   a hydraulic cylinder fixedly secured to said vehicle,
   a piston reciprocally received in said cylinder and dividing said cylinder into first and second chambers,
   a piston arm extending from said piston and beyond said cylinder and having its free end connected to said steering component for rotating same about an axis in response to movements of said piston,
   a fluid pressure supply communicating with said first chamber,
   a control valve pivotally mounted on said cylinder, said valve comprising a housing and a spool reciprocably received in said housing to selectively communicate said pressure supply and said reservoir to said second chamber to regulate the pressure therein,
   a spool arm extending outwardly to said valve housing,
   a linkage having a first end pivotally connected to said piston arm, an intermediate portion pivotally connected to said control arm and a second end,
   a manual input means connected to said second end for pivoting said linkage about said first end thus moving said spool arm and said spool relative to said housing, whereby
   the pressure in said second chamber is varied and said piston arm moves to pivot said steering component, and the movement of said piston arm causes said linkage to pivot about said second end to move said spool back to a null and balanced position, and
   an automatic control means for operating said control valve independent of said linkage, said manual input means and linkage being usable to manually override said automatic control means.

2. A steering system as defined in claim 1 and including a threaded section on the outer end of said spool arm and a threaded block on said intermediate portion of said linkage threadably receiving said spool arm, and wherein said automatic control means causes rotating of said spool arm and thereby causes said spool to move linearly due to said threaded engagement of said arm and said block.

3. A steering system for controlling the steering component of a vehicle comprising a hydraulic cylinder fixedly secured to said vehicle, a piston reciprocally received in said cylinder and dividing said cylinder into first and second chambers, a piston arm extending from said piston and beyond said cylinder and having its free end connected to said steering component for rotating said steering component about an axis in response to movements of said piston, a fluid pressure supply communicating said said first chamber, a control valve pivotally mounted on said cylinder, said valve comprising a housing and a spool reciprocably received in said housing to selectively communicate said pressure supply and said reservoir to said second chamber to regulate the pressure therein, pressure supply and exhaust apertures opening into said valve, lands on said spool for selectively blocking said apertures, said lands having circumferential grooves thereon, the axial distance between each groove and the width of each groove being less than the diameter of said apertures, whereby when said spool blocks the pressure aperture, pressure will be transmitted through said grooves about the circumference of said spool to balance radially inwardly directed forces applied thereto, a spool arm extending outwardly of said valve housing, a linkage having a first end pivotally connected to said piston arm, an intermediate portion pivotally connected to said control arm and a second end, a steering input means connected to said second end for pivoting said linkage about said first end thus moving said spool arm and said spool relative to said housing whereby, the pressure in said second chamber is varied and said piston arm moves to pivot said steering component, and the movement of said piston arm causes said linkage to pivot about said second end to move said spool back to a null and balanced position.

4. A steering system as defined in claim 3 wherein said valve housing includes end walls and said valve spool abuts either of said end walls upon continued movement of said linkage, whereby in case of hydraulic failure, said intermediate pivotal portion defines a fixed pivot upon abuttment of said spool and one of said end walls and continued movement of said linkage about said fixed pivot mechanically causes movement of said piston arm.

5. The steering system of claim 3 wherein said valve is a three-way valve.

* * * * *